July 12, 1949.  R. L. BROWN  2,476,207

MOLDING ATTACHING MEANS

Filed Dec. 18, 1947

INVENTOR.
ROBERT L. BROWN
BY
ATTORNEY

Patented July 12, 1949

2,476,207

UNITED STATES PATENT OFFICE 2,476,207

MOLDING ATTACHING MEANS

Robert L. Brown, Ferndale, Mich.

Application December 18, 1947, Serial No. 792,455

5 Claims. (Cl. 24—73)

This invention relates to the art of securing finishing objects such as moldings, trim strips, and the like, to supporting surfaces and more particularly to a method and means for securing finishing objects, in the combination of individual fastening elements, cooperating with a finishing object and designed for engagement in an apertured supporting surface for mounting the finishing object thereon.

Heretofore, individual fastening devices have been employed in securing objects to supporting surfaces and such fastening devices when made of the spring fastener type become loose from their fastening position and often become completely removed due to vibration and the fact that the sections or elements are not possessed of sufficient holding power in applied fastening position.

This invention therefore contemplates the provision of fastening means for use in securing molding or other material to a panel.

An object of the invention is to provide a deformable fastener having portions for securing the fastener to a panel and other portions for engaging the part to be secured to the panel.

A further object of the invention is to provide a one-piece clip fastening having securing devices for receiving a finishing object, deformable means for securing the fastener to a supporting member and other deformable means for holding engagement with the finishing object after the parts are in assembled relation.

Other objects and advantages of the invention will more fully appear from the following description taken in connection with the accompanying drawings in which.

Figure 1:
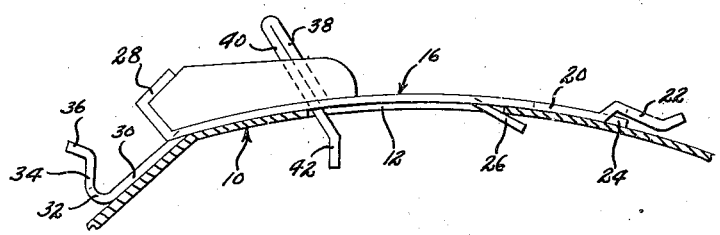
Fig. 1 is a cross sectional view through an apertured supporting member and the fastening member shown in side elevation.

Referring to the drawings, I have shown a supporting panel 10 having an aperture 12 to which a finishing object, such as a molding strip, is to be applied. The molding strip is generally designated as 14 and the clip as 16.

The molding illustrated is of the channel type having a main body portion and inwardly turned flanges 18 which are received by fastener clips 16 longitudinally spaced at intervals in the openings 12 of the panel 10. The clip shown comprises a sheet metal stamping having a body portion 20 conforming generally to the surface of the panel 10 and overlies the aperture 12.

One end of the body portion of the clip 16 is deformed upwardly, providing a tab 22 with a central projection 24, cut out of the deformed tab 22, which lies in the plane of the body portion of the clip. Spaced inwardly from the tab 22 is another tab 26 which is cut out of the body portion of the clip 16. The opposite end of the clip 16 has its edge portions bent upwardly and outwardly and then reversely bent inwardly, forming overhanging projections as V shaped flanges 28. Intermediate the edge portions forming the V shaped flanges are spaced extensions 30 connected at their outer ends by an upwardly extending flange 32 which is bent into a looped portion 34 and an outwardly extending portion 36.

Partly sheared out of the body portion between the flanges 30 is a strip of metal 38 which is bent upwardly, then reversely bent upon itself as at 40, and is projected downwardly through the opening formed by pressing out the sheared out strip of metal 38. The downwardly extending end of the part 40 is designated at 42 which projects beyond the under face of the clip body portion and is adapted to extend through the aperture 12 in the panel when the clip 16 is assembled to the panel 10.

The clip 16 is assembled to the panel by resting the body of the clip on the surface of the panel with the tab 26 and the end portion 42 projecting through the aperture 12, as indicated in Fig. 1. The metal strip 38 and the reversely bent portion 40 are bent inwardly forcing the clip to the right with the tab 26 in holding engagement with one edge of the aperture 12, the end portion 42 moving to the left in holding engagement with the opposite edge of the aperture 12. This position is illustrated in Fig. 2.

As a means for reinforcing the V shaped flange 28, there are upwardly extending side flanges 44 which are bent from the edges of the body portion of the clip. The outer ends of the flanges 44 are formed V shaped and are received underneath the outer ends of the V shaped flanges 28. This arrangement prevents inward distortion of the flanges 28 when the molding strip is applied.

Figure 2:
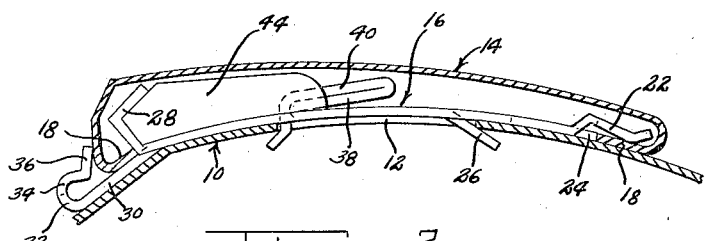
Fig. 2 is a view corresponding to Fig. 1 but showing a finishing strip in section applied to the fastener.
Figure 3:
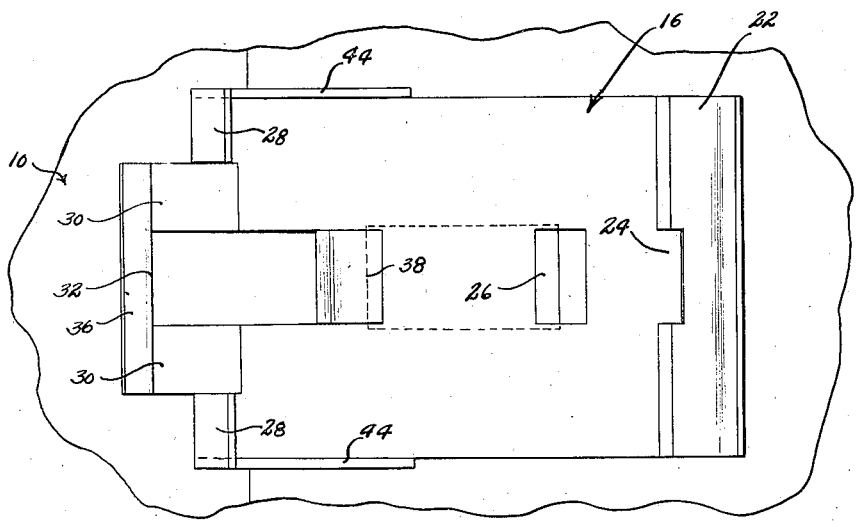
Fig. 3 is a top plan view of the fastener shown in Fig. 1.

After the clips 16 have been applied to the support 10, as illustrated in Fig. 2, one inwardly extending flange 18 of the molding 14 is inserted between the tab 22 and the upper surface of the support 10 and the opposite inwardly extending flange 18 is spring pressed over the V shaped flange 28. The looped portion 34 of the clip 16 is then bent inwardly into holding engagement with the edge of the molding urging the flange 18 downwardly and inwardly thereby securely holding the molding in applied position.

From the foregoing it will be readily appreciated that the structure disclosed is advantageous in that it provides a most efficient, rigid mounting for a molding on a support and facilitates the assembly of parts in mass production since the clips are readily applied to the support without the use of nut and bolt fastening devices and the molding is efficiently applied to the clips in securely held position.

While the invention has been described in one illustrated form, it will be understood that various changes including the size, shape and arrangement of parts may be made without departing from the spirit of the invention, and it is not my intention to limit its scope other than by the terms of the appended claims.

I claim:

1. A fastener for securing a substantially channel-shaped finishing object, having spaced attaching flanges, to an apertured support, said fastener comprising a strip of sheet metal having depending tabs intermediate its ends for insertion through the apertured support and in holding engagement with the support, a tab at one end of said fastener pressed out of the plane of said strip for overlapping one flange of the finishing object, means on said fastener for holding the other flange of the finishing object, and an outwardly extending portion at the opposite end of said fastener projecting beyond the finishing object and adapted to be deformed into engagement with an outer surface of the finishing object.

2. A fastener comprising a strip of sheet metal having a body portion, a downwardly depressed tab intermediate the ends of said body portion out of the plane of said body portion, a deformable stamped out portion adjacent said tab and projecting outwardly on opposite sides of said body portion, a tab at one end of said body portion extending in a plane out of the plane of said body portion, an overhanging projection at the opposite end of said body portion, and a deformable outwardly extending portion beyond said overhanging projection.

3. A fastener for securing a molding to a support having an aperture therein comprising deformable tabs for securing the fastener to the support through the aperture, portions at the opposite edges of said fastener for engaging the inner edges of the molding, and a deformable tab extending beyond one edge of said fastener for contacting an outer edge portion of the molding when assembled.

4. A fastener comprising a body portion having a V shaped edge portion, intermediate tabs pressed out of said body portion for securing said fastener to a support, reinforcing flanges for said V shaped edge portion, and a deformable tab extending outwardly beyond said V shaped edge portions.

5. A fastener comprising a body portion, a tab pressed out of said body portion and having a portion thereof reversely bent upon itself and extending outwardly on one side of said body portion and having another portion extending outwardly on the opposite side of said body portion, oppositely disposed end portions for receiving a part to be joined to said fastener, and a deformable tab extending outwardly beyond one of said end portions.

ROBERT L. BROWN.

No references cited.